(12) United States Patent
Phillips et al.

(10) Patent No.: US 9,919,821 B2
(45) Date of Patent: Mar. 20, 2018

(54) METHOD AND SYSTEM FOR POSITIONING FOOD PRODUCTS FOR LASER MARKING THEREON

(71) Applicant: YTA HOLDINGS, LLC, Los Angeles, CA (US)

(72) Inventors: Jonathan R. Phillips, San Juan Capistrano, CA (US); Richard C. Blackburn, Santa Ana, CA (US)

(73) Assignee: YTA HOLDINGS, LLC, Los Angeles, CA (US)

( * ) Notice: Subject to any disclaimer, the term of this patent is extended or adjusted under 35 U.S.C. 154(b) by 0 days.

(21) Appl. No.: 15/007,158

(22) Filed: Jan. 26, 2016

(65) Prior Publication Data

US 2016/0214745 A1  Jul. 28, 2016

Related U.S. Application Data

(60) Provisional application No. 62/107,540, filed on Jan. 26, 2015, provisional application No. 62/107,542, filed on Jan. 26, 2015.

(51) Int. Cl.
| | |
|---|---|
| *B65B 23/06* | (2006.01) |
| *B65G 19/02* | (2006.01) |
| *B65G 47/57* | (2006.01) |
| *B65G 47/51* | (2006.01) |
| *B65B 35/44* | (2006.01) |

(52) U.S. Cl.
CPC .............. *B65B 23/06* (2013.01); *B65G 19/02* (2013.01); *B65G 47/5113* (2013.01); *B65G 47/57* (2013.01); *B65B 35/44* (2013.01)

(58) Field of Classification Search
CPC ......... B65B 23/02; B65B 23/06; B65B 35/44; B65G 19/02; B65G 47/04; B65G 47/52; B65G 47/57; B65G 2201/0208; B65G 47/5113
USPC ......... 198/817, 728, 725, 479.1, 480.1, 721, 198/774.4
See application file for complete search history.

(56) References Cited

U.S. PATENT DOCUMENTS

| | | | | |
|---|---|---|---|---|
| 2,840,223 | A * | 6/1958 | Schoppee | B65B 35/44 198/463.6 |
| 3,135,386 | A * | 6/1964 | Reading | B07C 5/22 198/610 |
| 3,948,023 | A * | 4/1976 | Mumma | B65B 23/02 198/431 |
| 4,189,898 | A | 2/1980 | Moulds | |
| 4,195,736 | A | 4/1980 | Loeffler | |
| 4,505,373 | A | 3/1985 | Thomas | |

(Continued)

FOREIGN PATENT DOCUMENTS

WO   WO2011/091011   7/2011

*Primary Examiner* — Leslie A Nicholson, III
*Assistant Examiner* — Keith R Campbell
(74) *Attorney, Agent, or Firm* — Hankin Patent Law, APC; Susan L. McCain; Sergio Becerra

(57) ABSTRACT

Methods and systems for transitioning packages objects, such as eggs, from a packer into an infeed system providing a buffer such that the packer may operate independently of the subsequent system, such as an egg marking system. Systems and methods of stabilizing packed objects, such as eggs, as they move from the packer to a marking system includes logic to suspend operation of the delivery conveyor or system.

20 Claims, 20 Drawing Sheets

(56) References Cited

U.S. PATENT DOCUMENTS

| | | | |
|---|---|---|---|
| 4,514,963 A * | 5/1985 | Bruno | B65B 9/06 198/460.1 |
| 4,519,494 A | 5/1985 | McEvoy | |
| 4,519,505 A * | 5/1985 | Thomas | A01K 43/00 177/145 |
| 4,569,444 A | 2/1986 | McEvoy | |
| 4,750,316 A | 6/1988 | Bliss | |
| 5,321,491 A | 6/1994 | Summers | |
| 6,056,341 A | 5/2000 | Bliss | |
| 6,540,063 B1 * | 4/2003 | Fallas | B65B 5/105 198/419.3 |
| 7,588,239 B2 * | 9/2009 | Marcinik | B65H 31/40 198/412 |
| 8,084,712 B2 | 12/2011 | Griffiths | |
| 8,455,026 B2 | 6/2013 | Chait | |
| 8,455,030 B2 | 6/2013 | Chait | |
| 8,499,718 B2 | 8/2013 | Chait | |
| 8,543,233 B2 * | 9/2013 | Donati | G05B 19/41845 700/117 |
| 8,657,098 B2 | 2/2014 | Chait | |
| 8,715,757 B2 | 5/2014 | Chait | |
| 8,823,758 B2 | 9/2014 | Chait | |
| 8,884,185 B2 | 11/2014 | Griffiths | |
| 2011/0175974 A1 * | 7/2011 | Chait | B41J 3/4073 347/247 |
| 2011/0177208 A1 | 7/2011 | Chait | |
| 2012/0180436 A1 * | 7/2012 | Chait | B41J 3/4073 53/473 |

* cited by examiner

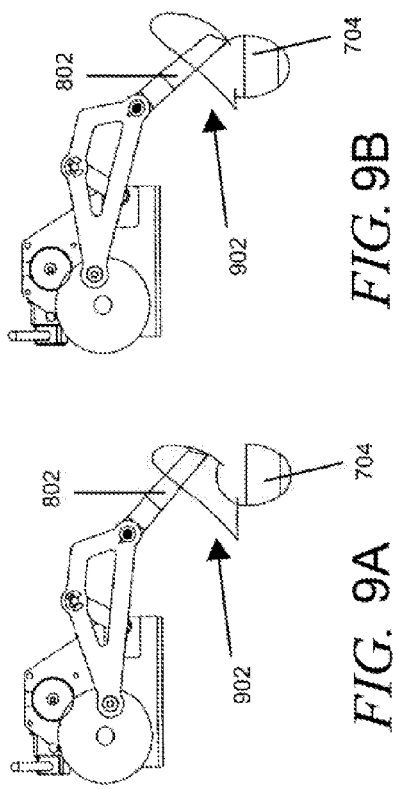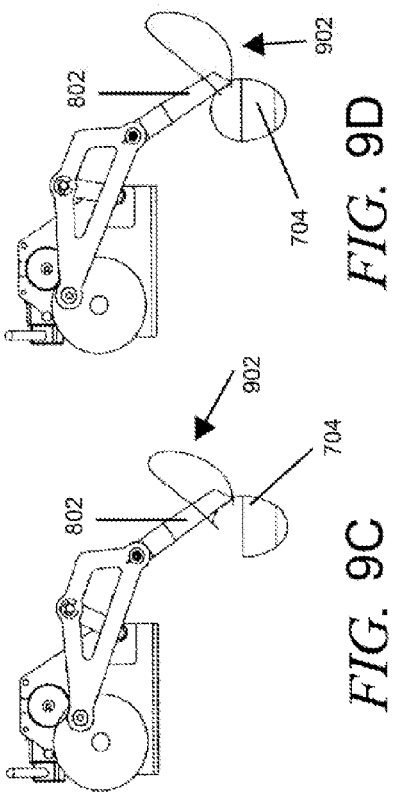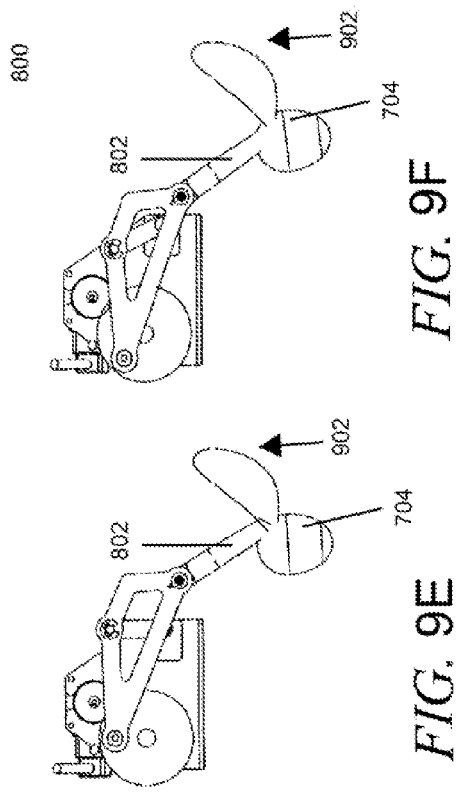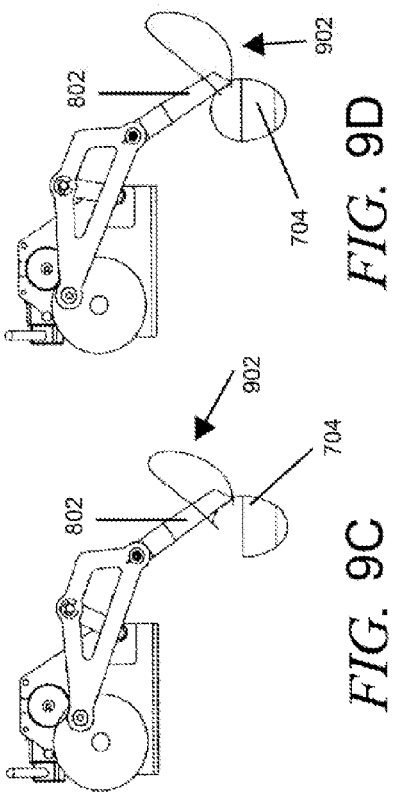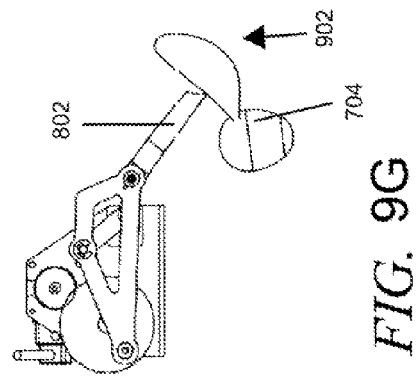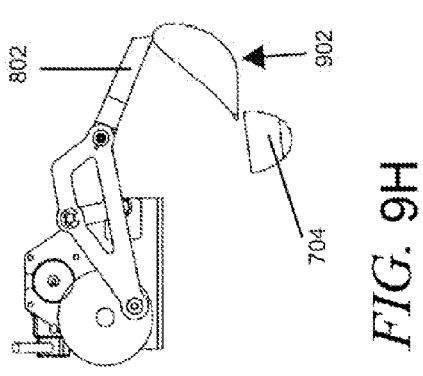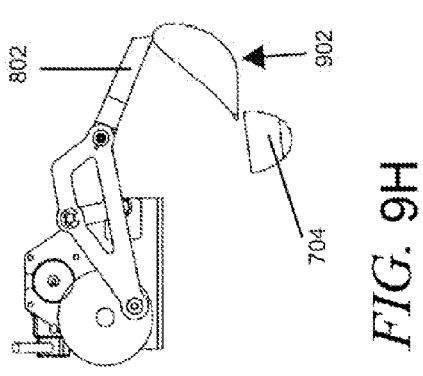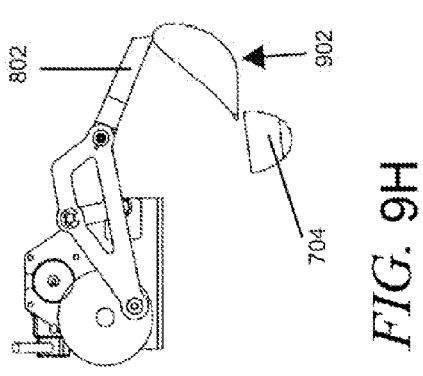

UNLESS OTHERWISE SPECIFIED:
DIMENSIONS ARE IN INCHES
TOL. PER ASME Y14.5M:
ONE PLACE DECIMAL   ±.03
TWO PLACE DECIMAL   ±.010
THREE PLACE DECIMAL ±.005
FOUR PLACE DECIMAL  ±.002
ANGULAR: ±0° 30'
SURFACE FINISH: 32√ MIN
REMOVE BURRS AND BREAK
SHARP EDGES .005 MAX
ALL DIAMETERS TO BE
CONCENTRIC TO .005 TIR
ALL DIMENSIONS APPLY AFTER
PLATING AND PROCESSING

METHOD AND SYSTEM FOR POSITIONING FOOD PRODUCTS FOR LASER MARKING THEREON

CROSS-REFERENCE TO RELATED APPLICATIONS

This application claims the benefit of U.S. Provisional Application No. 62/107,540 filed on Jan. 26, 2015 and U.S. Provisional Application No. 62/107,542 filed Jan. 26, 2015, the contents of which are incorporated herein by reference in their entirety.

BACKGROUND

Field of the Invention

The invention relates generally to the field of food product processing, and more particularly to egg processing. Although the present disclosure focuses on egg processing, the methods and systems of the present disclosure may be used for a large variety of food packing systems.

Eggs represent a food product distributed and consumed in large quantities. For many of the same reasons making them desirable food stuffs, eggs also present a unique safety risk. Eggs (most commonly chicken eggs) contain nutrients which can support the growth of dangerous bacteria, when contaminated.

To reduce the chance of a consumer being sold a spoiled egg, certain governmental bodies in the United States and elsewhere, e.g., the United States Food and Drug Administration (FDA), the United States Department of Agriculture (USDA), and various state governments, currently do not allow retailers to "repack" eggs, i.e., to move eggs from one package to another. This restriction, unfortunately, can result in tremendous waste. For example, whenever the integrity of even a single egg in a package in the hands of a retailer is compromised (e.g., is broken), the entire package of eggs must be discarded.

Not only is this wasteful of otherwise good eggs, but also of the resources used to produce those eggs. Eggs are a perishable item susceptible to spoilage, as well. To address the concern about spoilage—i.e., whether the egg is fresh—egg packages typically (and often by law or regulation) have expiration dates marked on them. However, eggs may be stored for days or even weeks before being sold at retail. Furthermore and of additional consideration in certain jurisdictions such date marking on packaging may not actually represent a period of time from laying of eggs, but may only represent a period of time from packing, even though the eggs themselves may have aged prior to being packed. Expiration dates (a term encompassing such variations as "sell by" and "best if used by" dates) thus may not convey to a consumer or user how "old" an egg truly is. Many consumers, moreover, move eggs from their packages into special receptacles in their refrigerators or consolidate eggs from multiple cartons together. In this fashion, additionally, eggs from multiple cartons may come to be intermingled, usually indistinguishably. When one or more of these things are done, the consumer is no longer able to evaluate the expiration date of individual eggs prior to using them.

Eggs typically undergo a great deal of processing before they are ready to be sold to the consuming public. In many circumstances, for example, eggs pass through several processing stations at which they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc.: U.S. Pat. Nos. 4,189,898; 4,195,736; 4,505,373; 4,519,494; 4,519,505; 4,569,444; 4,750,316; 5,321,491; and 6,056,341, the entire contents of each of which are incorporated herein by reference. It is not uncommon for a facility in which these stations operate to output about one million eggs in a single day. Accordingly, to be commercially acceptable, the throughput of the stations needs to be quite high, with some stations typically processing on the order of 20,000 eggs per hour.

The egg packing industry uses devices known as "packers" to pack the eggs into packages or cartons. Typically, a packer includes a conveyor (e.g., a belt conveyor, chain conveyor, etc.) that moves empty packages through an egg loading section (where the eggs are loaded into the egg loading section from above) and the moves the filled packages to a package closing section that is responsible for closing the lids of the packages. The eggs may be supplied to the egg packer via a grader system.

When contamination (and possibly spoilage) of eggs is discovered, therefore, not only is it likely that the number of persons made ill—or worse—will be quite large, but also that enormous numbers of eggs must be recalled and destroyed. Many of those eggs will not have been contaminated and will have to be destroyed—at considerable financial loss—because there is no way to isolate the bad eggs from the total population of eggs from a suspect source.

Several techniques for marking individual eggs with expiration dates and the like have been proposed. One such approach is to use vegetable dyes or other water-soluble ink products to mark eggs. Such products, however, have a tendency to leak into the interior of eggs and can result in undesirable ink spots within them. Further many of these techniques also required the use of inks classified as Food Additives by the FDA. The tendency of such products is to be of poor aesthetic quality, and to wash off or fade. Therefore this also means that such markings are susceptible to tampering and even unintentional loss of integrity (e.g., dripping and smearing from condensation and handling), and has generally limited their acceptance.

Several techniques for marking individual eggs with expiration dates and the like use solvent based inks. These inks seek to overcome the issues presented by water soluble inks but still result in the use of food additives and solvents. Such products while approved for food use are undesirable compared to completely chemical free alternatives and are therefore limited in their acceptance.

It is also known to use lasers to mark indicia onto perishable products for the purpose of tracking their pedigree and/or integrity (e.g., using date codes and/or traceability codes), as well as for allowing textual or graphical advertising messages to be disseminated via such products. An example of a system for laser marking such information on hen eggs is described, for example, in U.S. patent application Ser. No. 11/725,099, Publication No. 2008/0223834 ("the '834 Publication"), published on Sep. 18, 2008 (now U.S. Pat. No. 8,084,712 issued Dec. 27, 2011 and U.S. Pat. No. 8,884,185 issued on Nov. 11, 2014 (continuation of U.S. Pat. No. 8,084,712). The disclosure of the '834 Publication is incorporated herein by reference in its entirety. Additional laser marking apparatus and methods are disclosed in, for example, U.S. patent application Ser. Nos. 12/690,859, 12/690,872, 12/690,876, 12/690,886, 12/690,890, 12/690,896, and 12/690,898, all filed Jan. 20, 2010 (now U.S. Pat. No. 8,455,030 issued Jun. 4, 2013, U.S. Pat.

No. 8,657,098 issued Feb. 25, 2014, U.S. Pat. No. 8,499,718 issued Aug. 6, 2013, U.S. Pat. No. 8,715,757 issued May 6, 2014, U.S. Pat. No. 8,455,026 issued Jun. 4, 2013, still pending application Ser. No. 12/690,896, and U.S. Pat. No. 8,823,758 issued Sep. 2, 2014), each titled "Systems And Methods For Processing Eggs" and hereby incorporated by reference herein; and in PCT Application No. PCT/US2011/021680, Publication No. WO2011/091011 (the '011 Publication), which claims priority to these seven applications and is also incorporated by reference.

Once eggs have been packed into a carton by the packer, they may be sent to a subsequent system, such as a laser marking system, for further processing. Depending on the throughput of that subsequent system compared to that of the packer, there is a risk that filled, open cartons may not have adequate space to queue. This may result in unwanted collisions and may result in egg breakage. When breakage occurs, the entire system must typically be shut down to allow for cleaning, which can take upwards of ten minutes. Alternatively the packer system may be forced to pause processing, until space is available for the open carton to be passed to the subsequent system. During this pause, eggs continue to be delivered to the packer by the grader. If the accumulated pause time exceeds a certain value (such value being dependent on several factors including packer configuration, grader processing speed, and processing rate of the subsequent system), the grader stops delivering eggs to the packer. This in turn may reduce the efficiency of the overall egg processing facility.

These problems are exacerbated by the fact that egg cartons typically used for packing are configured to hold the largest sized eggs. Eggs are typically packed such that the smaller, more pointed end is facing downward. As a result, when smaller eggs are packed in a carton, they tend to jostle and vibrate due to the movement of the egg carton through the packing system. Even larger eggs may move or jostle due to the motion of the carton as it moves through the packing system.

Such movement and jostling makes the eggs less suitable for laser marking. For example, when a carton is stopped to allow for the laser marking of one or more of its eggs, the eggs may not be at an optimal angle for marking Further, the eggs may still be moving or vibrating within the carton when the carton stops. As a result, unproductive waiting time ("egg settling time") is required to allow the eggs to settle before they can be lased. Users of current systems must therefore choose between decreased laser time, resulting in less marking content, or poorer quality markings or decreased throughput of lased eggs. In an optimal system, the conveyor may move cartons at the highest possible speed while maximizing lasing time such that the non-lasing time is as short as possible. Such a system could accomplish this by minimizing or removing the egg settling time when the carton stops to allow the eggs to be laser marked.

Systems and methods are therefore needed to both provide an infeed system capable of creating a buffer between the packer and the laser system that allows the timing of the laser system and that of the packer to be independent of one another and to allow the packer to continue packing eggs even if the lasing system is stopped. Systems and methods are further needed to stabilize eggs leaving the infeed system and entering the laser system such that they do not move and are at an optimal angle for lasing.

One desired consequence of an embodiment of the disclosure is that maximum throughput is achieved when the cyclic operation of the packer can continue unimpeded by the cyclic operation of the laser operation and related indexing and conveying system, by facilitating the ability for the latter device to operate asynchronously of the former device. Such operation being desirable as the movement and dwell cycles of the packer, exhibits and benefits from, longer movement cycles and shorter dwell cycles, and conversely the lasing operations for marking eggs perform better with shorter movement cycles and longer dwell cycles. In order that the movement of product between the packer and the laser marking apparatus proceeds efficiently, one embodiment of the disclosure includes logic and hardwired circuitry capable of interfacing to the packer and temporarily pausing its operation, however such pauses are detrimental to total throughput if applied indiscriminately. The disclosure in consideration of the foregoing provides operational methodology that negates or minimizes any such loss of productivity by only causing such pauses to occur on a deterministic basis and only at a particular point in the duty cycle using consideration of the independent phases of both packer and laser indexing conveying apparatus in their respective asynchronous cycles.

BRIEF SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with the embodiments herein, the present disclosure includes systems and methods for an improved infeed system that can rapidly process eggs after they have been packed while providing a buffer area for the packed cartons before the eggs are marked with ink, lasers, or any other suitable means known in the art.

In accordance with the embodiments herein, the present disclosure includes a system and method for stabilizing eggs after they leave the infeed system and as they enter the laser marking system such that they do not need time to settle and are at an optimal angle for laser marking, which may include the eggs being pulled upward or downward within the carton. In a preferred embodiment, the egg stabilizing system resides above the eggs and moves parallel to the position of the eggs and at a slightly faster speed than the eggs as their carton moves along the conveyor. The system includes one or more arms ending in flexible tips or "fingers." As the first row of eggs approaches the optimal position for laser marking, the arms and fingers descend such that the fingers transcribe a predetermined path. When following this path, the fingers make contact with the eggs, and in doing do stabilize them and pin them back against the back of their pocket in the carton. The fingers also position the eggs at an angle that is optimal for laser marking. In some embodiments, the eggs may be raked into a position that provides the maximum tapestry for the eggs in the row behind them prior to encountering the egg stabilizer.

After the laser marking is complete, the row of eggs move forward, and the fingers travel forward with them for a brief period. The fingers then transcribe a relatively steep and tall vertical path such that they allow the recently lased eggs to clear before they descend and repeat the process anew on the next row of eggs.

In some embodiments of the present disclosure, the fingers are flexible such that they can accommodate many different sizes and shapes of eggs in combination with different types of cartons.

In some embodiments of the present disclosure, the fingers have two prongs to better accommodate different sizes and shapes of eggs.

In some embodiments, there is a tapered entry to the path transcribed by the flexible fingers, centers the eggs in the laser marking field, thus maximizing the laser marking tapestry.

In some embodiments the raking motion is specifically designed to drag the egg upward and back thereby exerting little downward force that would potentially pinch or squeeze the egg between the fingers of the raking arm and the carton. Such methods have been proven to require less force, reduce the potential for damage and improve the reliability of egg positioning Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate the example embodiments. In the figures, like reference numerals designate corresponding parts throughout different views.

FIG. 9A-9H are a series of side views depicting the path of a an embodiment of a egg stabilizing system and flexible finger.

DETAILED DESCRIPTION OF THE PREFERRED EMBODIMENTS

Figure 1:
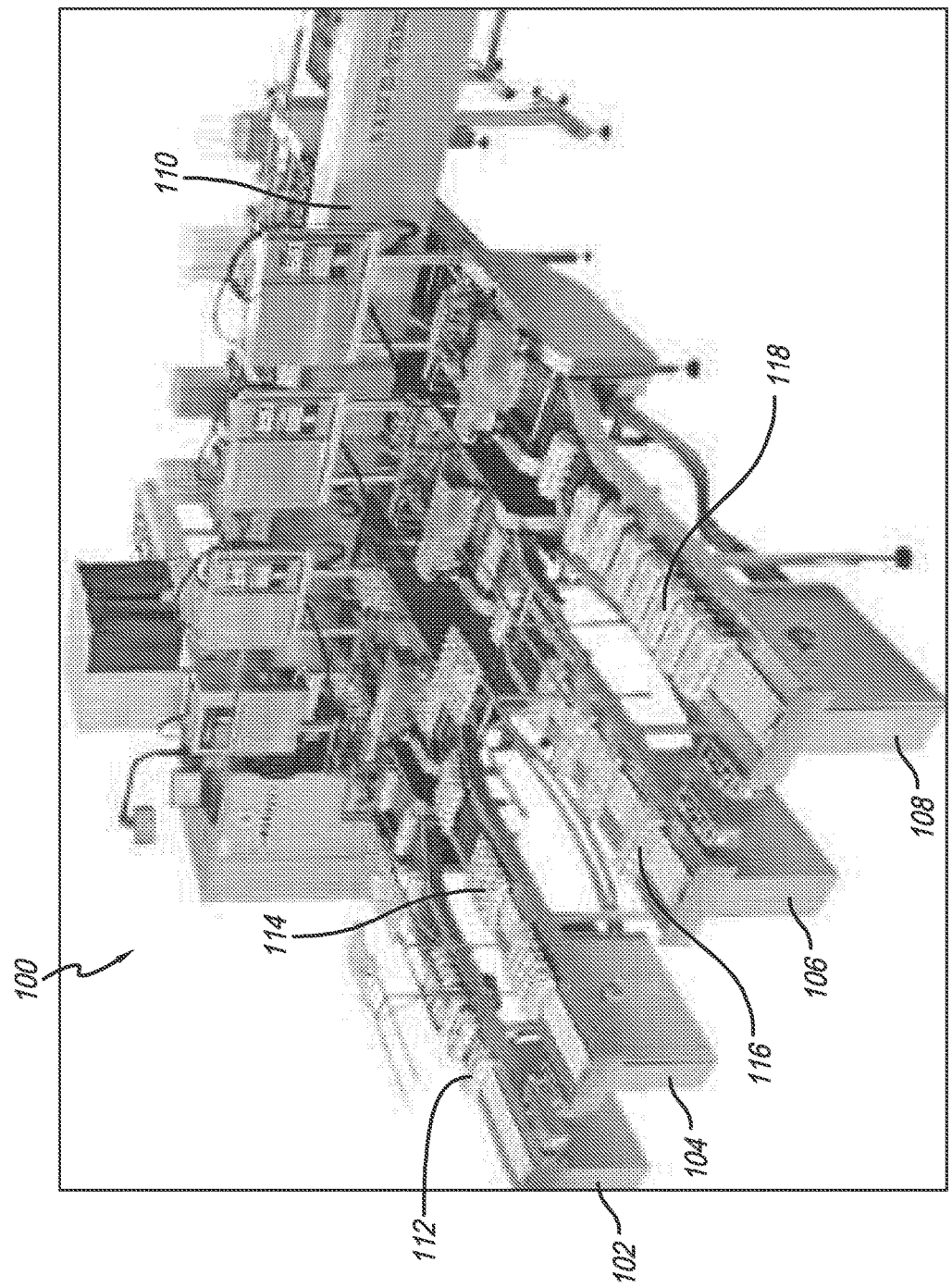
FIG. 1 is a diagrammatic view depicting an embodiment of an egg processing system.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein In general, the embodiments herein provide for methods and systems for improved carton infeed and egg stabilization to allow the packer and laser system to operate at independent speeds, to allow the packer to continue packing eggs regardless of whether the laser system is currently marking eggs, and to maximize lasing time for the eggs while also maximizing throughput of cartons through the laser marking system.

Figure 2:
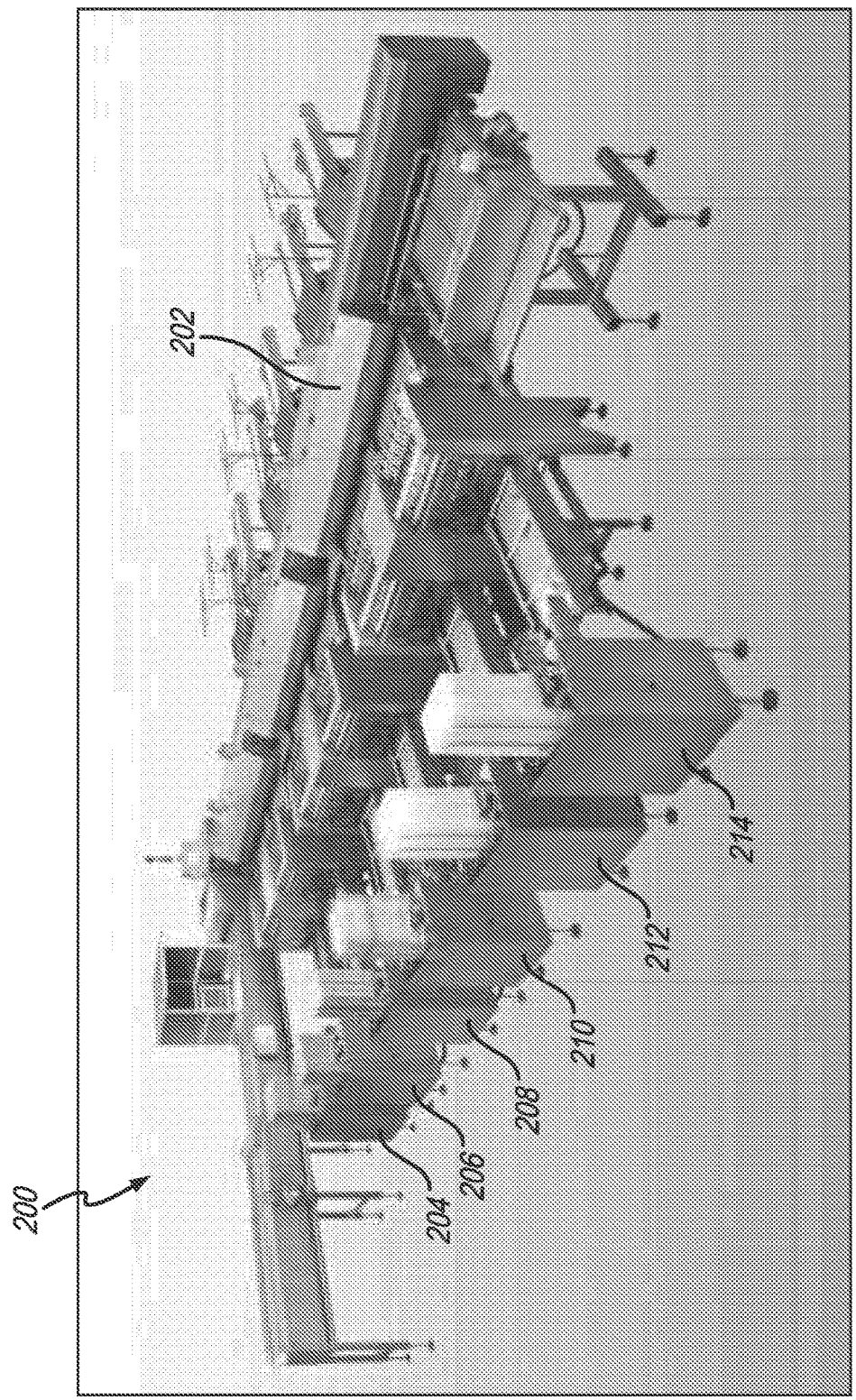
FIG. 2 is a diagrammatic view depicting another embodiment of a different egg processing system.

In FIG. 1, an egg processing system 100 is shown having a plurality of packers 102, 104, 106, and 108 and a grader system 110 that passes the eggs to the packers which pack the eggs into packages 112, 114, 116, and 118. Similarly, FIG. 2 shows another egg processing system 200 that includes a grader system 292 and a plurality of packers 204, 206, 208, 210, 212, and 214.

In typical operation, the packed eggs may then be delivered to an egg marking system that may mark upon the eggs information such as "sell by" or "use by" dates using any suitable means known in the art, including a laser marking system for lasing the information onto the eggs.

Referring to FIGS. 3A through 3E, a series of perspective diagrams with cutaways of an embodiment of an infeed system according to the present disclosure is shown. In these figures, different components are made invisible to make it easier to see and understand certain individual components. In this embodiment, belts 302, supporting member 312, and guide rails 304 all reside within the packer, which is connected to the infeed system 300 by brackets 314 or any other suitable means. In some embodiments, additional elements may reside within the packer. After eggs are packed in the carton, the carton (not shown) comes into contact with belts 302, which pull the carton from the packer into the infeed system 300. In some embodiments, the belts 302 pull the carton from the packer at a speed faster than that which the carton delivers the cartons to the infeed system. As the carton moves into the infeed system, it encounters ramps 340. Ramps 340 are at an incline that is at an angle that is the average of that of belts 302 and conveyor chain 316. The ramps 340 position the carton such that it is as the appropriate height for the conveyor chain 316. Because some cartons are made of flexible material, in some embodiments, a supporting member 312 is positioned between the belts 302 to prevent the carton from sagging in the middle before it encounters conveyor chain 312. The supporting member may be made of metal, plastic, or any other suitable material to provide sufficient support to a carton. This supporting member prevents the carton from catching on components of the infeed system. As the carton enters infeed system 300, guide rails 304 position, straighten, and center the carton so that it is perpendicular to the path of conveyor chain 316. As belts 302 pull the carton up the ramps 340 and into the infeed system 300, the carton passes under a sensor 306 emitting an optical beam 308. Once the carton passes completely through optical beam 308, conveyor chain 316 actuates and cleat 318 comes into contact with the back of the carton and pulls the carton further into infeed system 300. As the open carton passes the static orientor 310, the static orientor 310 helps position the eggs in their individual carton pockets such that they are centered in the pocket and in as optimal a position for subsequent egg stabilisation and laser marking as possible. The static orientor 310 may be a semi-flexible curtain with slits, a series of flexible rods, or may be any other suitable means for adjusting the positions of the eggs as they pass through it.

According to some embodiments of the present disclosure, after the carton passes the static orientor 310, it enters the infeed system's buffer 301. The buffer 301 may be of a size that it can hold numerous cartons. As a result, if the marking system has stopped or is operating more slowly than the packing system, the cartons may be queued in the buffer 301 where they are kept square and collision free until they can be gently handed off from the infeed system 300 to the marking system (not shown). This functionality allows the packer and the marking system to operate independently from another to the maximum extent possible. In some embodiments, the buffer 301 contains sensors that are networked to a processor that is further networked to the packer. When the buffer 301 nears capacity, the sensors signal the processor to temporarily shut down packer operations. In some embodiments, the buffer is a two-carton buffer based on the number of cleats in the infeed system. In alternate embodiments, the buffer has additional conveyors suitable for moving multiple cartons.

In some embodiments of the present disclosure, sensor 306 may be an optical sensor, a laser sensor, a tactile sensor, or any other suitable means for detecting an egg carton.

In some embodiments of the present disclosure, guide rails 304 may be spring loaded to accommodate various carton widths. In some embodiments, the guide rails 304 have a funnel-shaped design in the folded edges to catch carton lids that are not flat, keeping them down close to the conveyor and preventing unintended or premature accidental carton closing or damage to cartons or lids or equipment.

In some embodiments of the present disclosure, the hand-off of the carton from the cleat 318 on the conveyor 316 to the marking system is servo controlled to facilitate a smooth transition. In some embodiments, the infeed cleat conveyor can slow to a stop once the buffer or marking system has control of the carton and can wait for the carton to clear before rotating on the sprocket, thereby avoiding applying any force to the carton once the carton is under the control of the marking system.

Figure 3A:
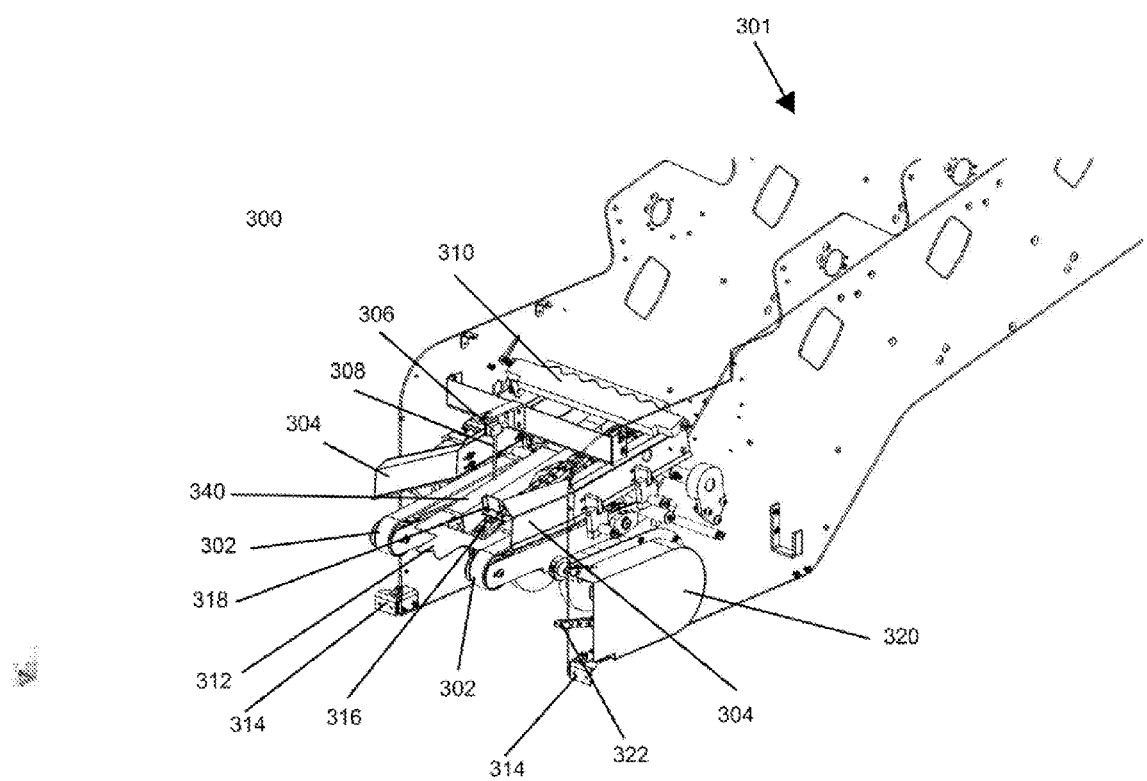
FIG. 3A-3E are different views depicting an embodiment of an infeed system.
Figure 3B:
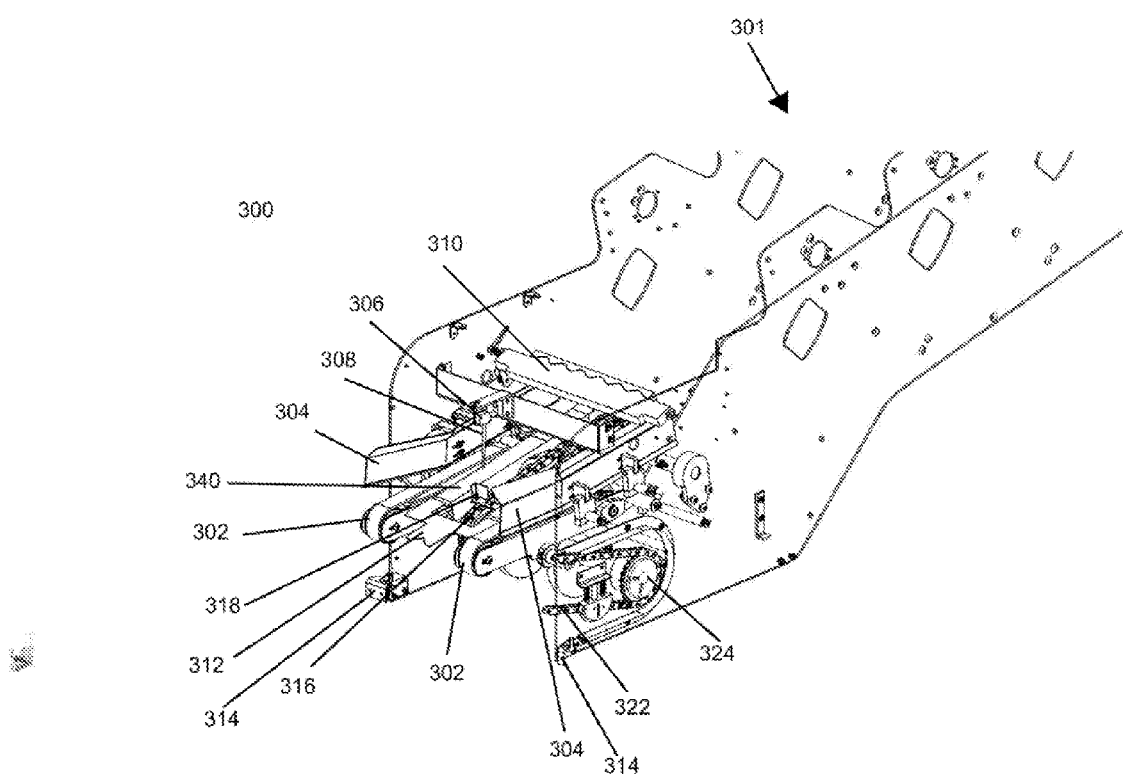

Referring to FIG. 3B, gearbox 320 is cut away to show sprocket 324 and chain 322 that together constitute an independent chain drive to power belts 302. This chain drive allows the belts 302 to move at a faster speed than the packer conveyor, if desired. In an alternate embodiment, chain 322 is driven by a sprocket on the packer.

Figure 3C:
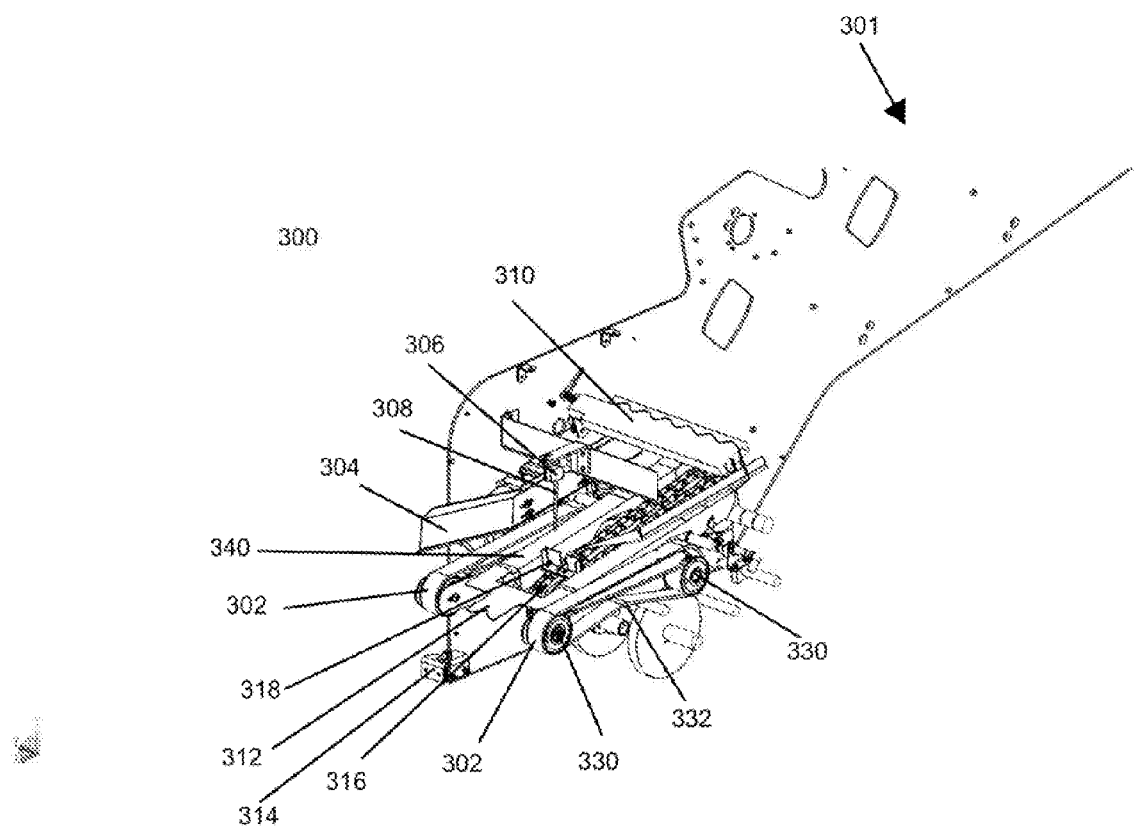
Figure 3D:
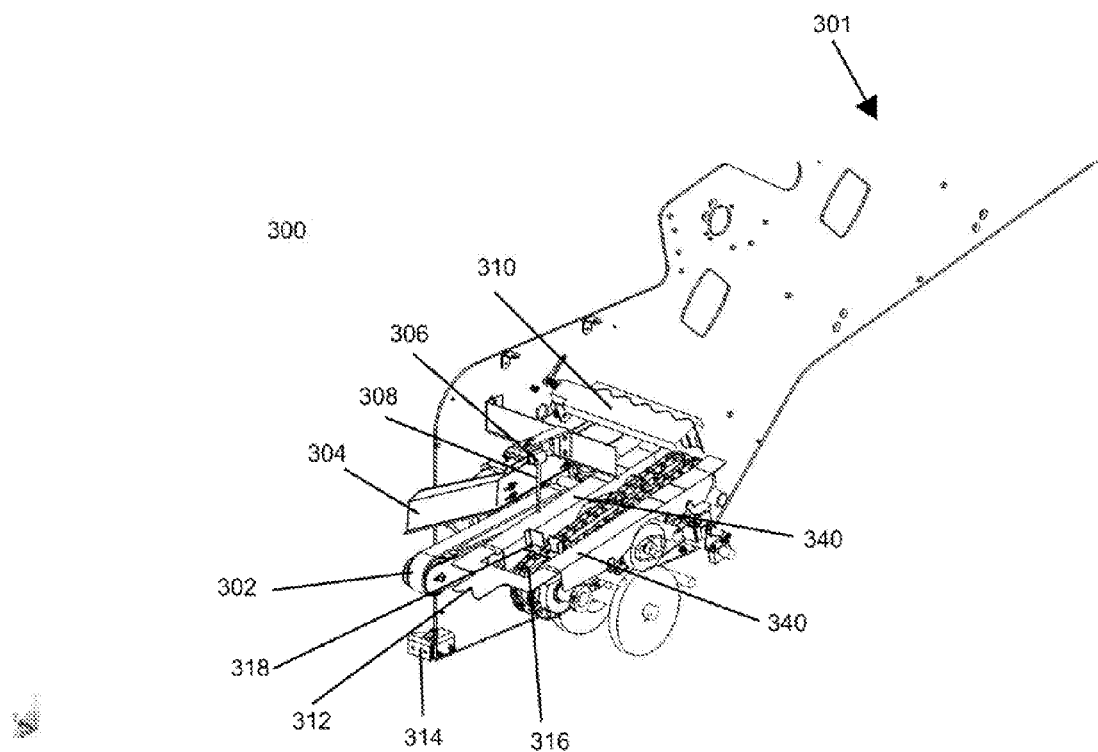

Referring to FIG. 3C, belt 302 is visible. Belt 302 encircles sprockets 330. In typical belt systems, the spacing of the sprockets from one another determines the tension on the belt. This results in the cumbersome replacement of a belt when it wears out because at least one of the sprockets must be disengaged from the rest of the system to decrease the belt tension sufficiently for the belt to be removed. The new belt must then be stretched to the required level of tension when the sprocket is reconnected to the system. In accordance with a preferred embodiment of the present disclosure, belt 302 is sufficiently large that the distance between sprockets 330 is insufficient for it to be taut. A runner lever 332 is raised to create the desired level of tension in the belt 302. When it is time to change out belt 302, the runner lever 332 is lowered causing belt 302 to loosen sufficiently that it can be removed from sprockets 330 without having to disengage either sprocket 330 from the rest of the system. Thus tension in the belt 302 is set simply by lowering and fixing the belt and sprocket assembly into the position shown, and additional tensioner mechanisms or other fixing or adjustment mechanisms are not required.

Figure 3E:
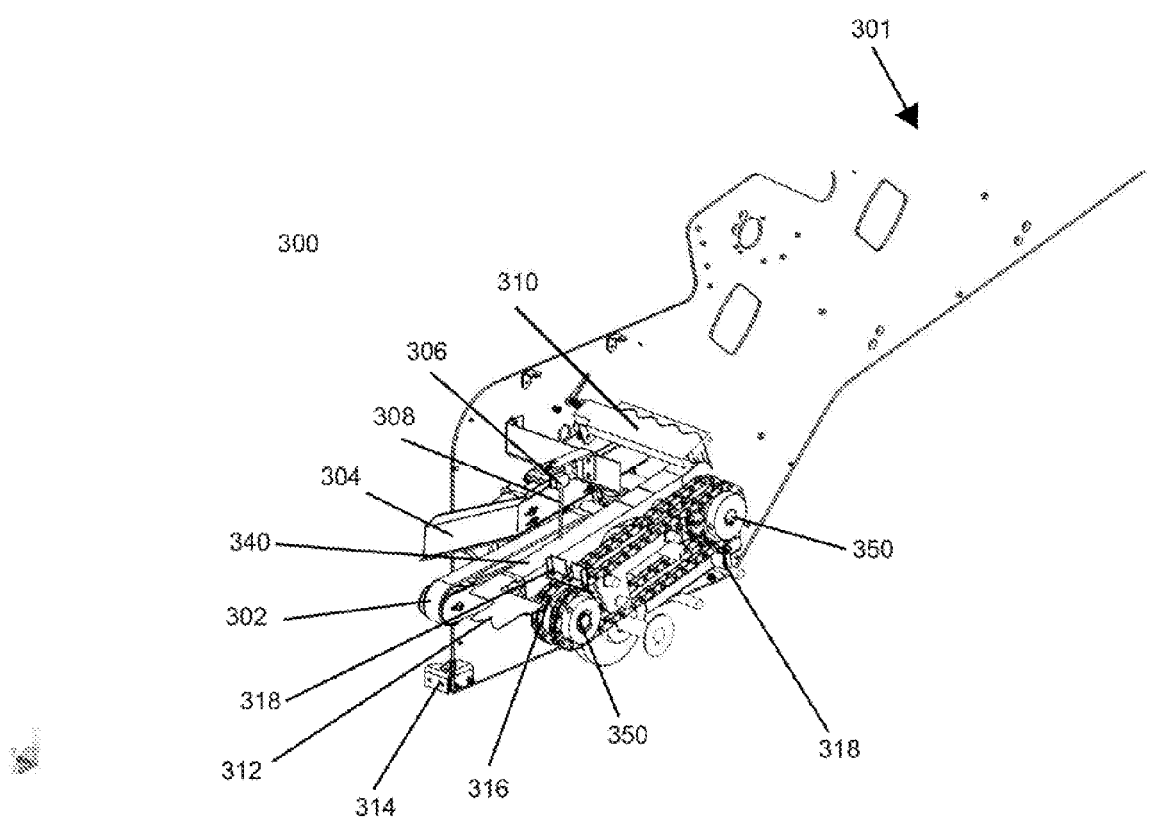

Referring to FIG. 3E, the chain conveyor 316 is connected to two diametrically opposed cleats 318 that are positioned 180 degrees apart from each other. Having these two cleats allows the system to process twice as many cartons per revolution of chain conveyor 316 and thus improves system performance. For instance, the next carton can be pulled into the infeed system by one cleat while the other is transitioning the previous carton to the buffer or to the marking system.

Figure 4A:
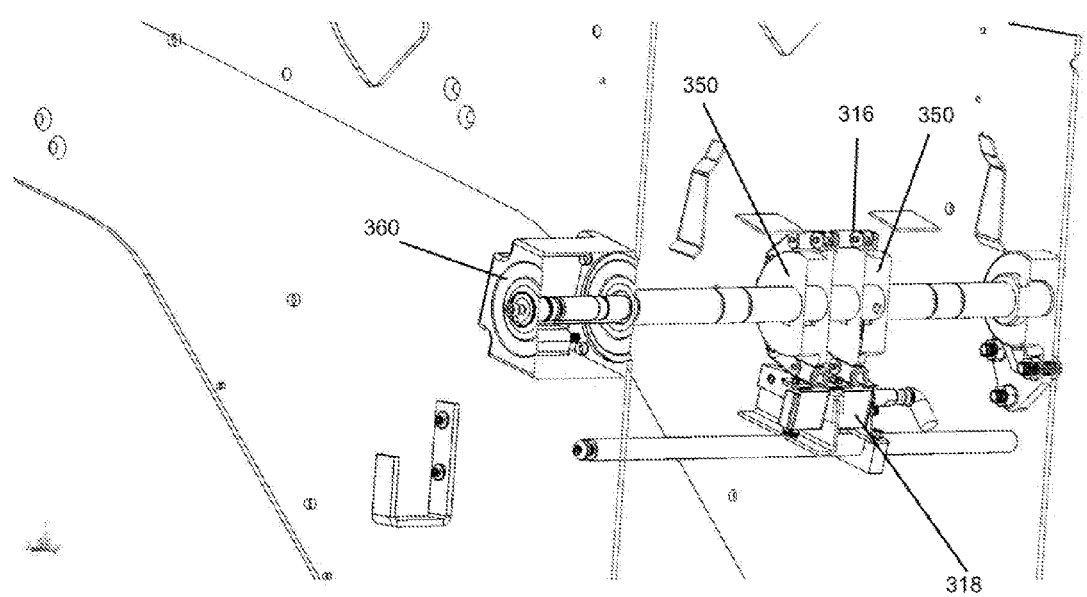
FIG. 4A-4B are different levels of cutaway views depicting a conveyor chain assembly of an embodiment of an infeed system.
Figure 4B:
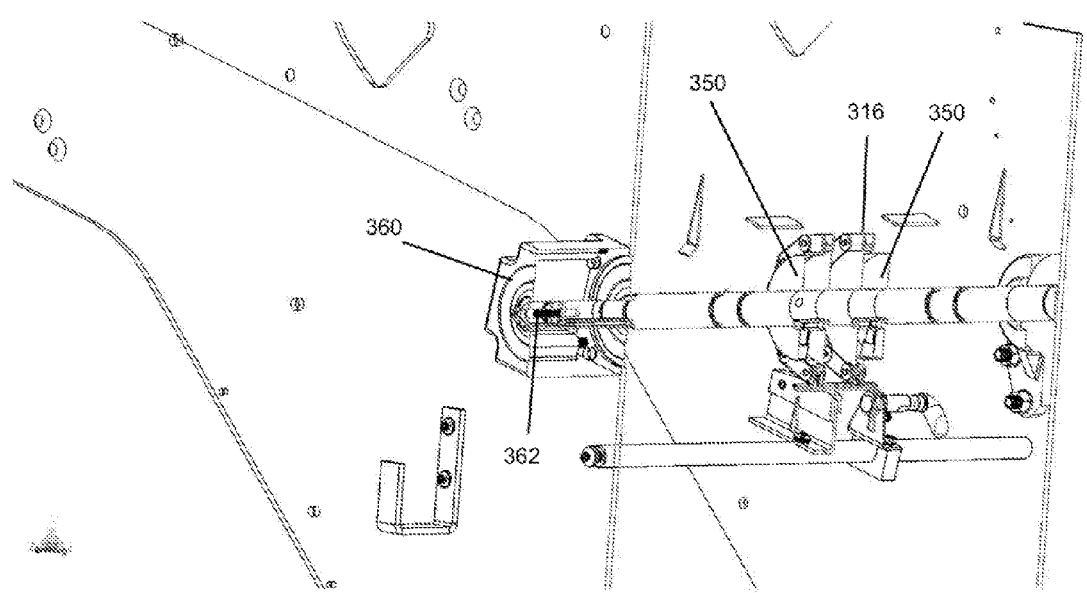

FIGS. 4A and 4B depict two cutaways of an embodiment according to the present disclosure wherein conveyor chain 316 is connected to shaft with connected sprockets 350, which in turn are connected to bearing 362, which is integral with gearbox 360. Shaft with connected sprockets 350 are connected via gearbox 360 to a suitable motor (which may be a servo motor) to drive chain conveyor 316. The use of a right-angle gearbox 360 with integral bearing 362 obviates the need for additional bearings, couplings and the like, which add cost and may reduce servo motor performance. It is to be understood that, in alternate embodiments, chain conveyor 316 may be any suitable conveyor system known in the art.

Figure 5A:
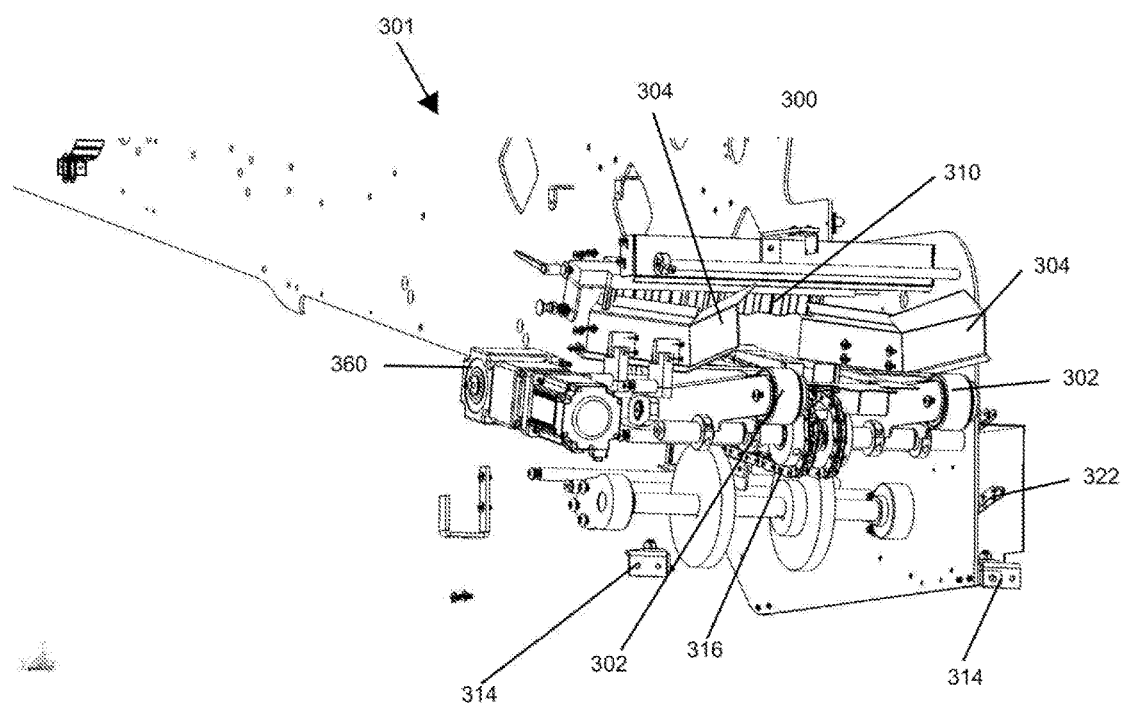
FIG. 5A-5C are different cutaway views depicting an embodiment of an infeed system.
Figure 5B:
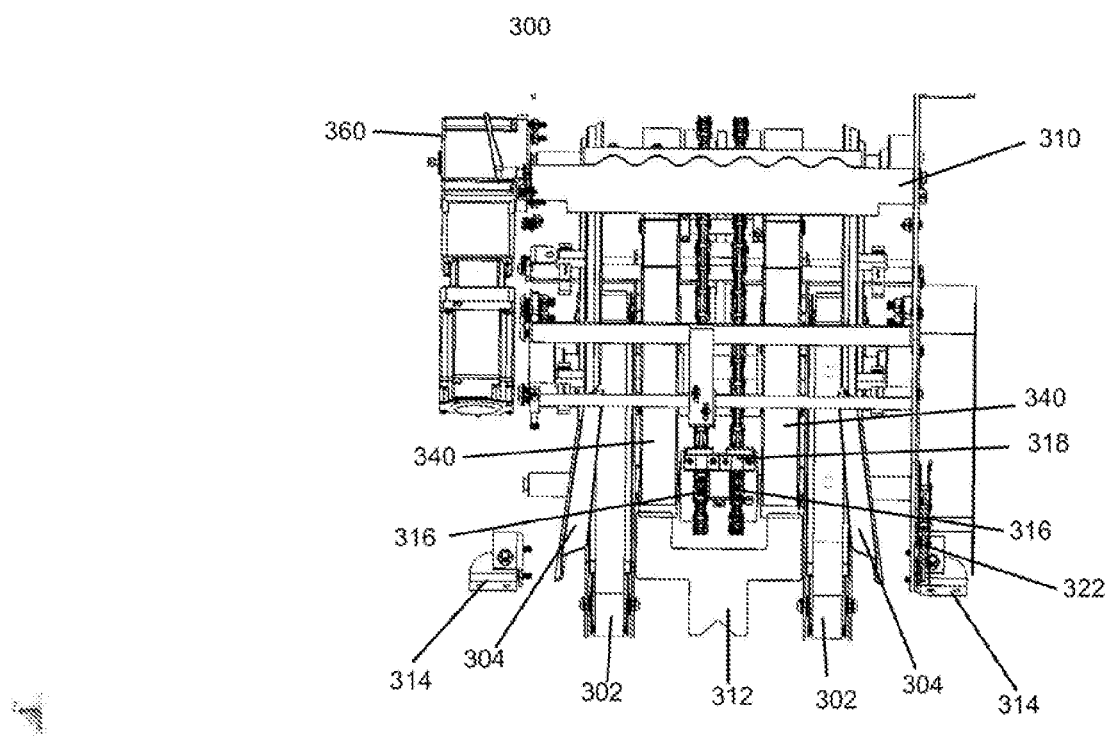
Figure 5C:
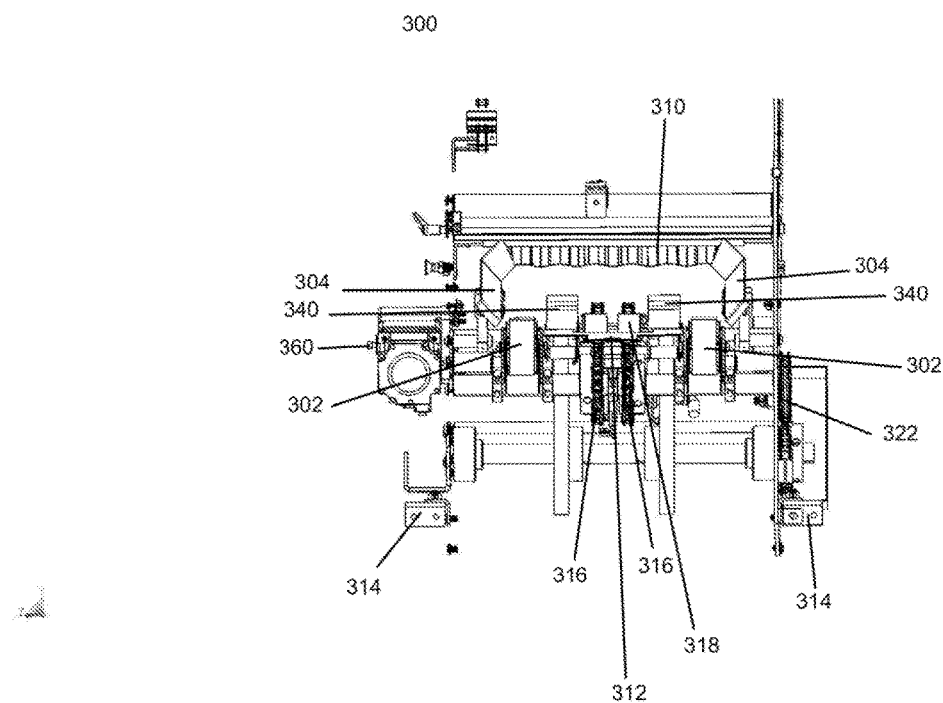
Figure 6A:
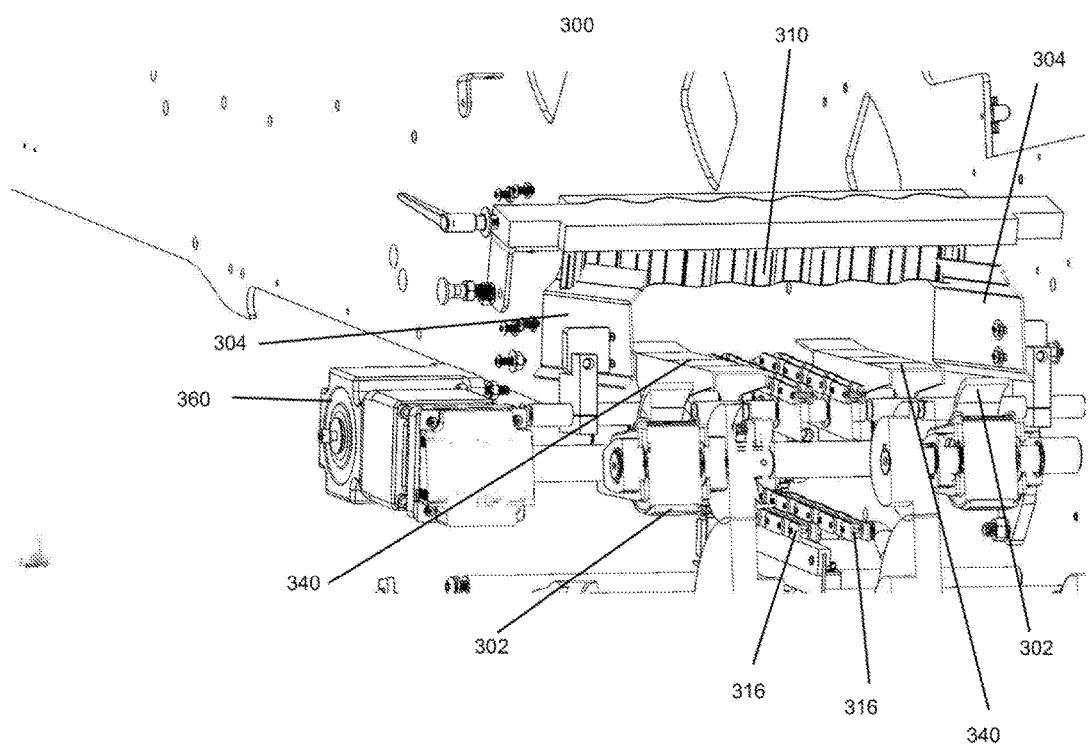
FIG. 6A-6B are different cutaway views depicting an embodiment of an infeed system.
Figure 6B:
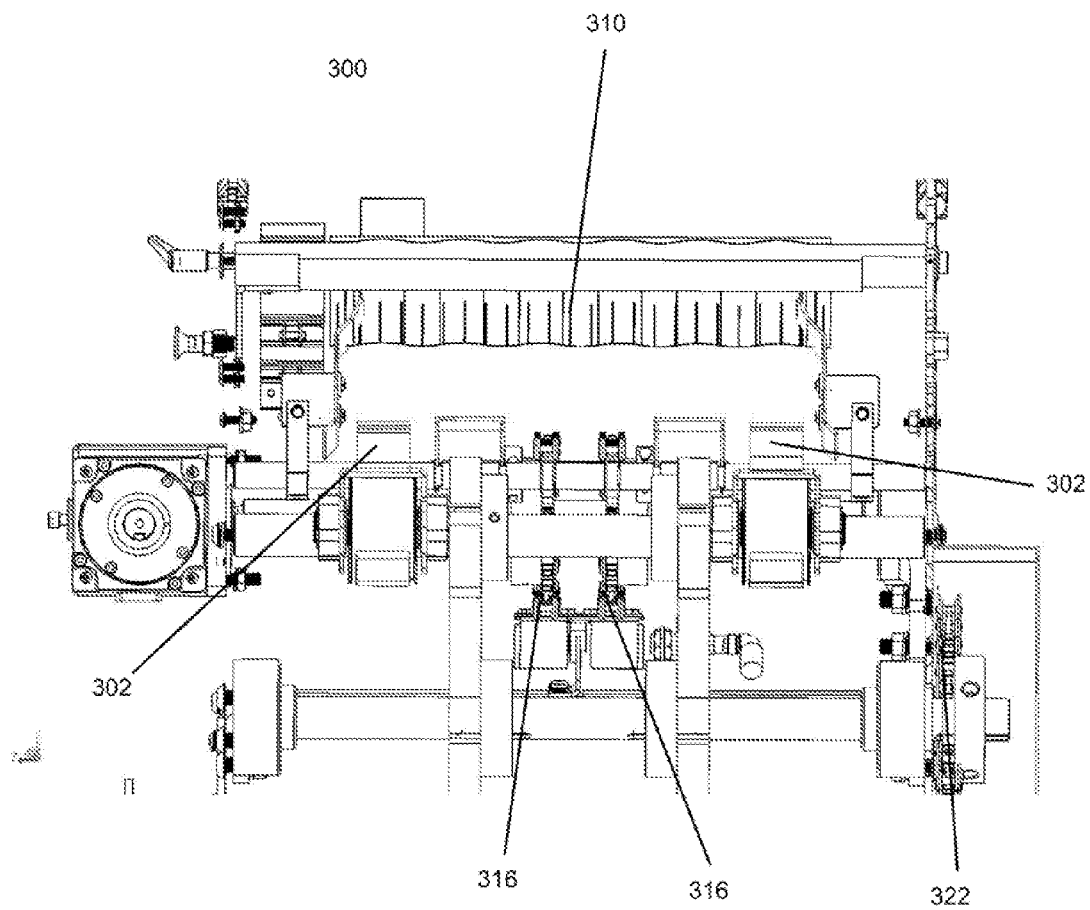

Referring to FIGS. 5A to 6B, additional perspectives of system diagrams with various cutaways of an embodiment according to the present disclosure are shown for increased clarity. FIG. 5A depicts a front perspective view of the infeed system 300. FIG. 5B depicts a top view of the infeed system 300. FIG. 5C is a front view of infeed system 300 from the perspective of an incoming egg carton. FIG. 6A is a front perspective cutout view of infeed system 300, and FIG. 6B is a cutaway front view of the infeed system 300 from the perspective of an egg carton entering the system.

Figure 7:
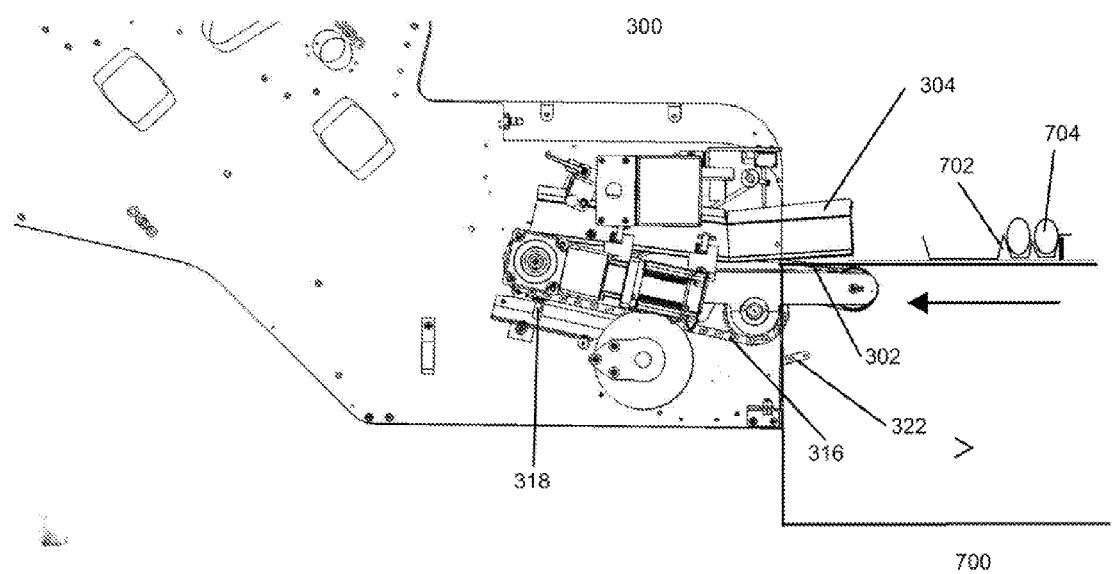
FIG. 7 is a side view depicting an embodiment of an infeed system, together with an egg carton with eggs, showing the direction of travel of the egg carton.
Figure 8A:
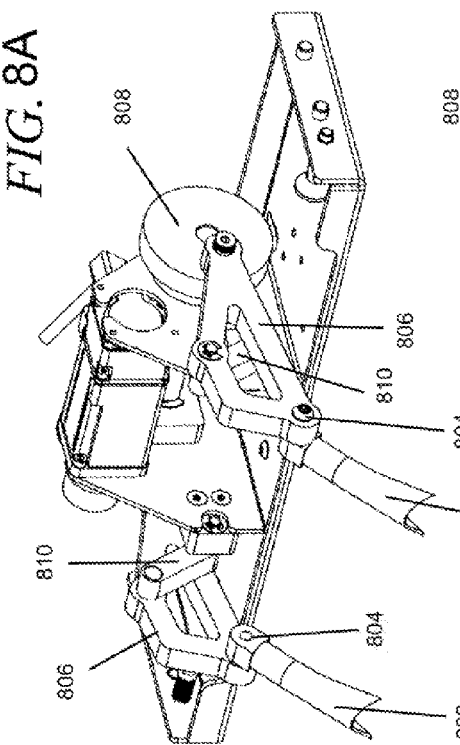
FIG. 8A-8D are different views depicting an embodiment of an egg stabilizing system.
Figure 8B:
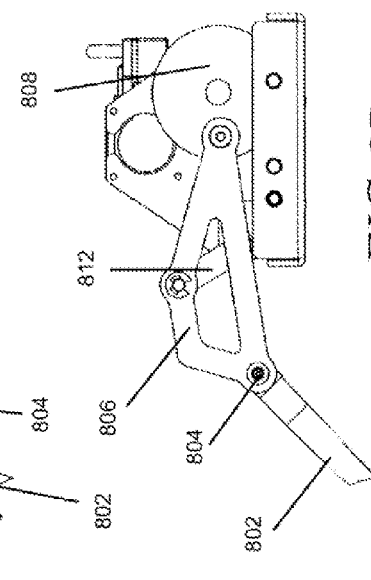
Figure 8C:
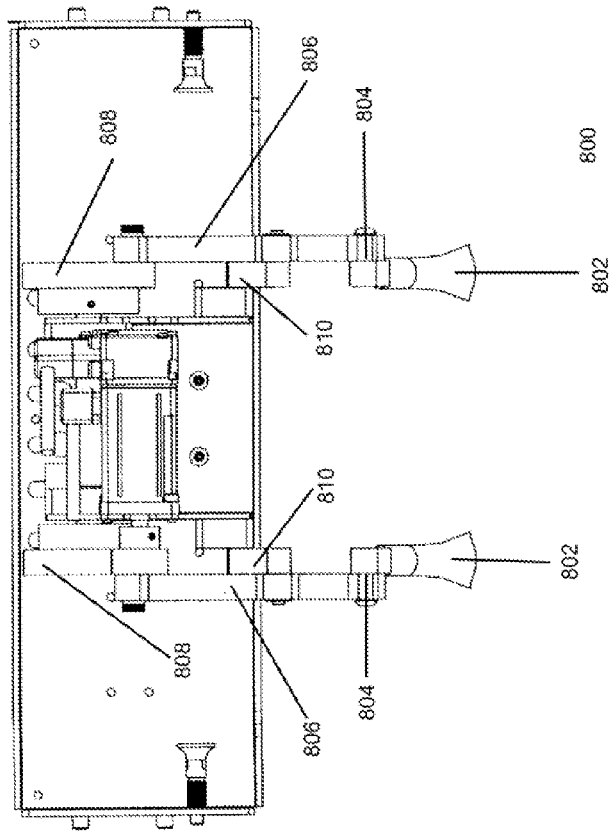
Figure 8D:
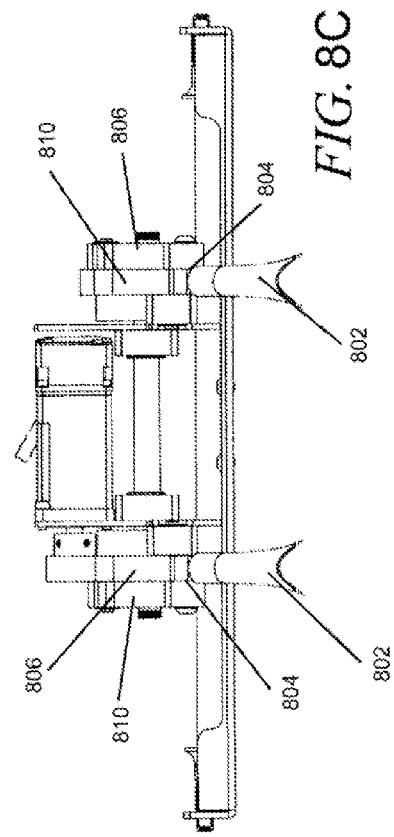

Referring to FIG. 7, a side view of infeed system 300 is shown with eggs 704 and carton 702 scaled to size. Carton 702 moves in the direction of the arrow to enter the infeed system.

In some embodiments of the present disclosure, the infeed system is independent of packer type and can therefore work with different types of packers, whether they be indexing or continuous motion types.

In some embodiments, the cyclic operation of the packer can continue unimpeded by the cyclic operation of the laser operation and related indexing and conveying system, such asynchronous operation being desirable as the preferred timing of movement and dwell cycles of the packer are different from the equivalent timing of cycles for the lasing marking system. In a preferred such embodiment, logic circuits and hardwired circuitry are included that interface between the laser marking system control system and the packer electronic control system, which when activated cause a temporary pause in the packer's operation. The same interfacing circuit is used to pause the packer operation when the infeed system is unable to accept more cartons. The logic circuits are activated at a suitable and deterministic point in the packer operating cycle, such that the packer can continue to operate to its normal sequence of operations and fill cartons with eggs for as long as possible before being forced to pause due to the infeed system being unable to accept an additional carton. As soon as the infeed is able to accept another carton, or shortly prior to that as deterministically calculated by the logic circuit, the pause interface is deactivated and the packer is allowed to continue with its normal cycle including feeding cartons of eggs into the infeed system.

In a preferred embodiment, the packer pause interface is effected using an existing standard interface and operable function of the packer electronic control system.

In some embodiments, sensors are added to the packer that allow the laser marking system to determine and keep track of the operational state of the packer, specifically the current state of the packer within its cycle. This information may be processed in conjunction with the state of the infeed system and laser marking system, to determine whether a pause in the packer cycle will be required.

It is to be understood that the infeed system in the present disclosure can accommodate 12-pack, 18-pack, and 24-pack, cartons and various 30-pack and 20-pack egg flats, and special-configuration cartons such as Jumbos and 6-packs.

According to some embodiments of the present disclosure, upon exiting the infeed system, the carton will enter a laser marking system, which, according to some embodiments of the present disclosure, will includes an egg stabilizing system.

Referring to FIGS. 8A through 8D, various perspective views of system diagrams of an egg stabilizing system are shown. The system includes a wheel, sprocket, or other suitable structure 808 connected by a bolt, bearing or any other suitable means to a stiff member 806. The stiff member 806 is in turn connected by a bearing or any other suitable means to a lever 810 and to a bearing 804 or any other suitable means, which connects to a flexible finger 802. The rotation of the wheel 808 combined with the movement of the level 810, cause the stiff member 810 to manipulate the movement of the flexible finger 802. The flexible finger 802 may further change its pitch by rotating on the axis provided by the bearing 804. The bearing described in this and other embodiments may be any other suitable means known in the art to allow rotation by one or more of the connected parts on an axis provided by that means. In some preferred embodiments, the bearing 804 may be a fixed pin allowing no rotation on the axis.

It is to be understood that any suitable configuration of mechanisms known in the art may be combined to cause flexible finger 802 to transcribe the path intended. Servomotor-based control of the mechanism allows motion profile to be optimized or improved relative to the carton motion, on a carton-type by carton-type basis. It is also understood that the mounting plate design of the embodiment shown in FIGS. 8A through 8D prevents debris from falling into the cartons below the egg stabilizing system.

Referring to FIGS. 9A through 9H, the egg stabilizing system is shown as the flexible finger 802 transcribes the path 902 during its operation. Through the manipulation of the flexible finger 802 by the members depicted in FIGS. 8a through 8d, the flexible finger 802 begins transcribing the path 902 as shown in FIG. 9a as the egg 704 moves forward along the conveyor. In the views shown in FIGS. 9A through 9H, the eggs move from right to left. In FIG. 9B, the flexible finger 802 reaches the lowest point in its path 902 and comes in contact with the egg 704.

Referring to FIGS. 9C and 9D, the flexible finger 802 transcribes the path 902 in a horizontal motion at a speed that is faster than the egg 704 as it moves through the conveyor system. In so doing, it pulls the egg backward and slightly upward to pin the egg 704 against its pocket in the carton so that it is stabilized when the carton stops moving and so that the egg 704 is in the optimal position for laser marking to take place, as shown in FIG. 9E when the carton (not pictured) and the egg 704 contained therein cease moving forward. This optimal position provides maximum laser tapestry on the egg based on its position in the pocket, its angle to the laser, and its distance from the laser, which is rendered consistent by the pressure of the finger against the egg. At this point, the laser marking system (not pictured) lases the egg 704. The path the flexible finger transcribes allows it to move into position while the egg is in motion, eliminating the need for extra "egg settling" delay that would be required in an embodiment in which a finger moves into position after the egg has stopped.

In some embodiments of the present disclosure, the flexible finger 802 holds the egg 704 gently and on the side at a tangential angle, thus minimizing localized pressure on the egg shell and thereby decreasing the risk of damage to the shell.

Referring to FIG. 9F, the egg 704 begins moving forward, and the flexible finger 802 begins moving with it.

Referring to FIG. 9G, the finger transcribes a high pitched and vertically tall motion such that it reaches its highest point as shown in FIG. 9h. This position allows for the clearance of the egg 704 as it moves forward along the conveyor (not pictured) without further contact with the flexible finger 802. At this time, the next egg 704 is moving forward along the conveyor (not shown) and the process begins again as shown in FIG. 9A.

In some embodiments, the motion profile of the fingers allows successful orienting and stabilizing of eggs even with tall posts in the carton, because the downwards portion of the motion profile is coordinated with the motion of the carton, moving the fingers between the posts and the eggs, close to the trailing edge of the eggs, and then raking back from there. In further embodiments, computerized offsets specific to carton types and egg sizes may be stored on a remote server. These offsets may be recalled and implemented. In some embodiments, sensors, barcode scanners, and other suitable means determine the size and shape of the eggs as well as the carton type to allow for rapid changeover between offsets as different cartons of eggs move through the egg stabilizing system.

Figure 10:
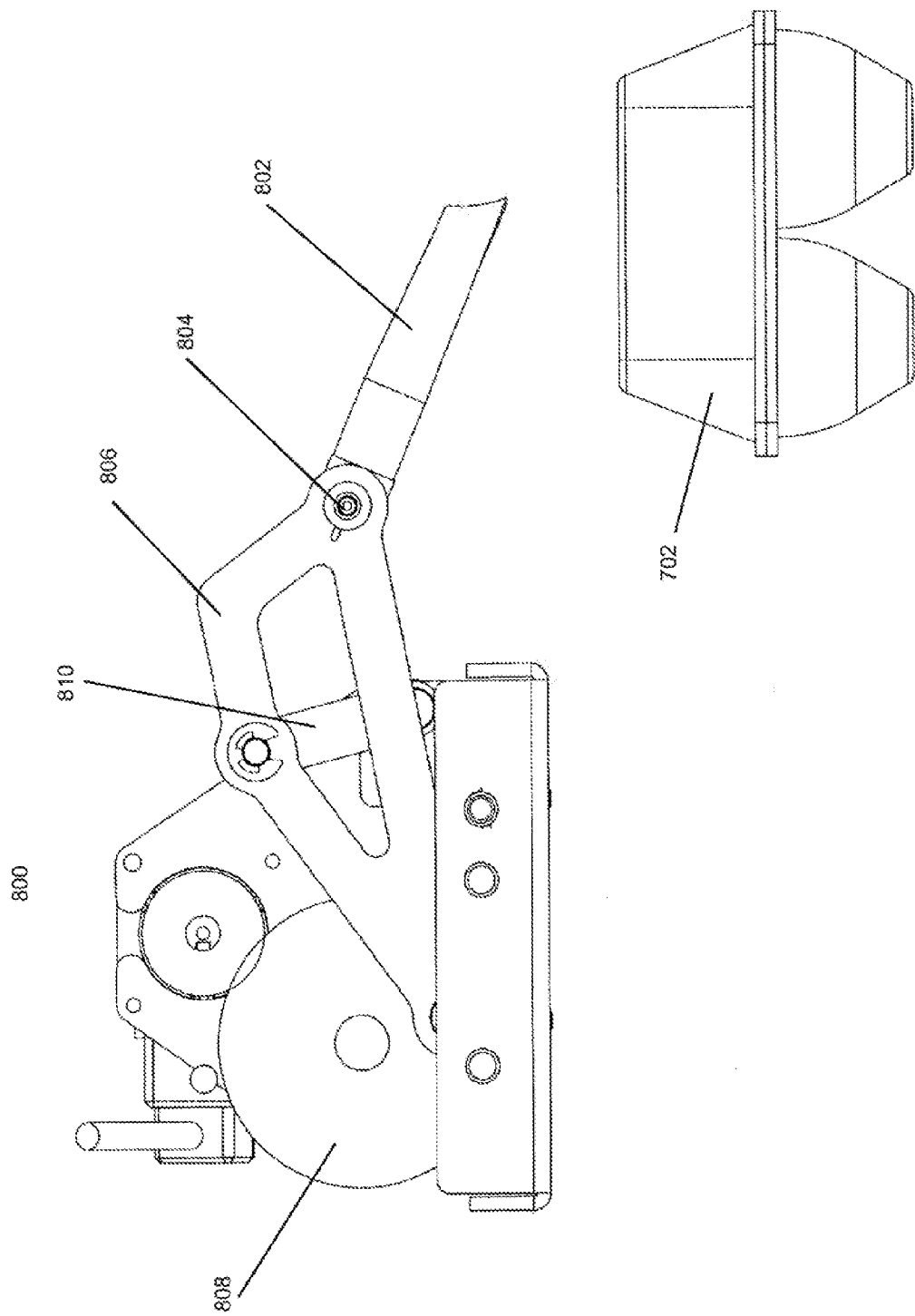
FIG. 10 is a closer side view depicting an embodiment of a egg stabilizing system and egg carton.

Referring to FIG. 10, the egg stabilizing system 800 is shown in a parking position wherein the flexible finger 802 is at its highest point, allowing for carton 702 or other objects to move along the conveyor (not shown) without coming into contact with the flexible finger 802.

Figure 11A:
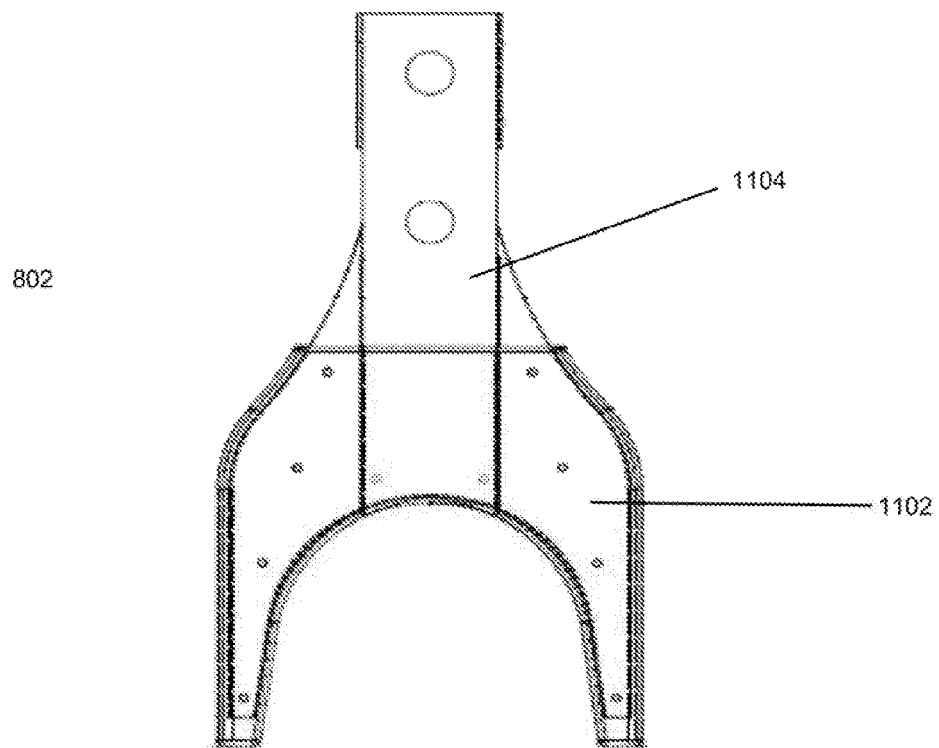
FIG. 11A-11C are different views of an embodiment of a flexible finger.
Figure 11B:
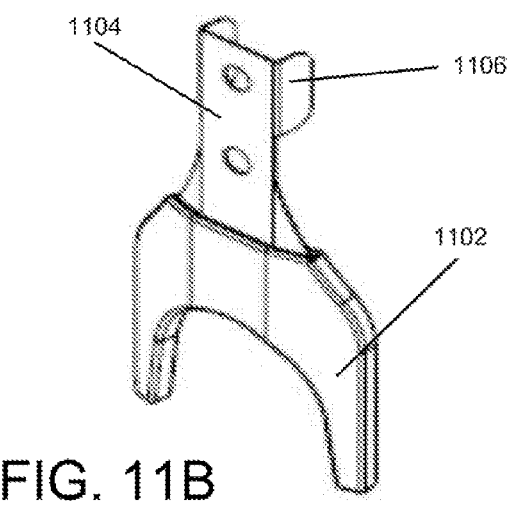
Figure 11C:
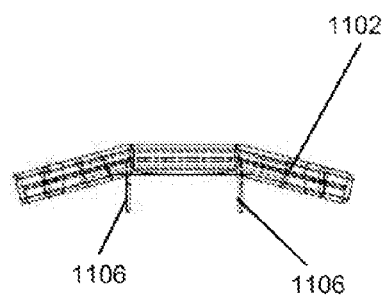

Referring to FIGS. 11a through 11c, a preferred embodiment according to the present disclosure is shown wherein the finger 802 consists of a member 1104 and a two-pronged flexible set of fingers 1102. In this embodiment, the flexible finger 1102 is better able to manipulate the egg due to the two-pronged u-shape of the flexible finger 1102.

Figure 12A:
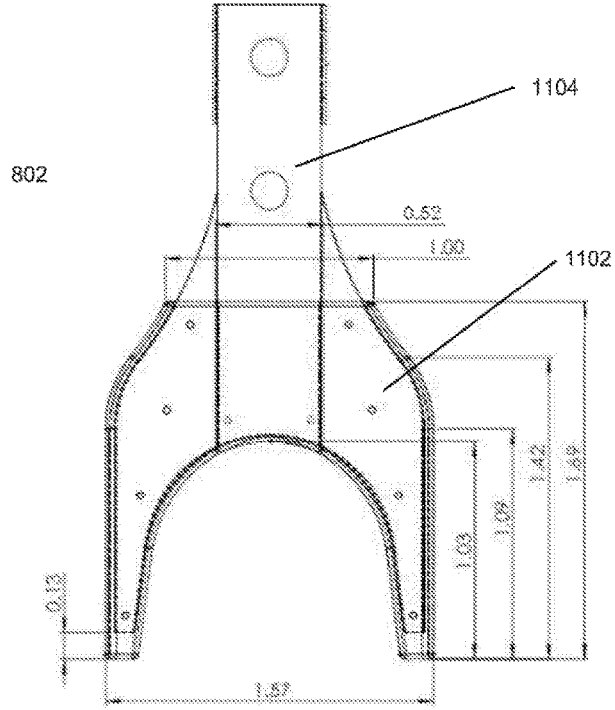
FIG. 12A-12C are different views of a preferred embodiment of a flexible finger.
Figure 12C:
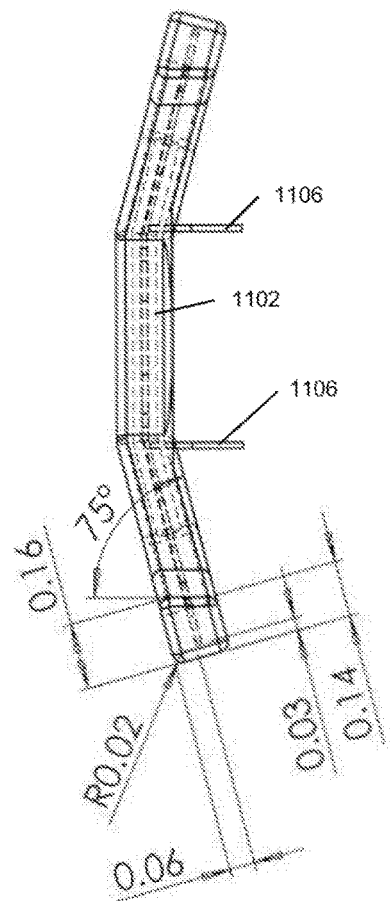
Figure 12B:
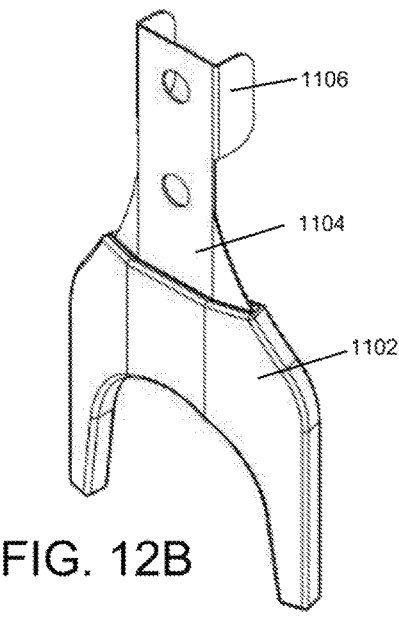

Referring to FIGS. 12a through 12c, a preferred embodiment according to the present disclosure is shown. The flexible finger 802 comprises a member 1104 consisting of a bracket with flanges 1106 for attachment to the stiff member 806 via the bearing 804 as well as a two-pronged flexible finger 1102. Bearing 804 may be any other suitable means known in the art to connect the member and the flexible finger while allowing the finger to move independently of the member. In a preferred embodiment, the member 1104 is comprised of sheet metal 304 SST, and the two-pronged flexible finger 1102 is comprised of the same sheet metal as member 1104 but has been dipped in urethane. In some embodiments, member 1104 and finger 1102 are a single unit of sheet metal with finger 1102 dipped in urethane. It is to be understood that the member 1104 and the finger 1102 may be comprised of any suitable material known in the art. The dimensions of a preferred embodiment of the flexible finger 802 are also shown in FIGS. 12A through 12C.

In a preferred embodiment according to the present disclosure, a homing sensor is used to determine the position of the wheel 808, which allows the servo controller to accurately guide the flexible finger to the egg.

In an alternate preferred embodiment of the present disclosure, a homing sensor is not used, and instead the Z-pulse of the servo motor is used to determine the homing position.

In some embodiments of the present disclosure, the egg stabilizing system is self-contained with minimal controls. In a preferred embodiment, only three wires are needed, two for the servo actuator and one for the homing sensor.

In some embodiments of the present disclosure, the egg stabilizing system is directly driven from the indexing conveyor thereby negating the requirement for additional motors and homing position.

In some embodiments, the egg stabilizing system is a drop-in, pull-out configuration that slides into position, missing all surrounding equipment in the marking system, which may include lasers, shutters, vision actuators, extraction piping, and the like. In some embodiments, this configuration incorporates integral pins that slide into slots in the conveyor sides, with latches to minimize or decrease accidental removal or unintended movement due to internal motions, forces, or momentums.

In a preferred embodiment of the present disclosure, the egg stabilizing system's motors and any associated gears and any associated mechanisms are self-contained within the volume envelope of the system. In an alternate embodiment, the actuator may be mounted outside with a simple spring-loaded shaft to transfer the motion to the mechanism.

It is to be understood that the number of flexible fingers employed may be reconfigured to accommodate the number of lasers associated with any particular laser marking system.

In some embodiments, the egg stabilizing system is networked to a processor and/or a series of sensors such that, when no marking is to occur or if eggs are not present in the carton, the egg stabilizing system will not operate or will operate at a limited capacity.

In some embodiments, the flexible fingers are spring loaded.

In some embodiments, the egg stabilizers employ a quick-removal design incorporating spigots and spring-loaded shafts.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The invention claimed is:

1. A conveyor system for transporting objects along at least one path through a processing system, wherein the processing system includes an object packaging component and an object marking component, wherein the object packaging component includes an outfeed for outputting a plurality of packages, each package containing at least one object, wherein the object marking component includes an infeed for receiving the plurality of packages and a marking unit operable for marking on at least one object contained in at least one of the plurality of packages, the conveyor system comprising:
 a processor operable for controlling the conveyor system;
 a package conveyor component operatively coupled to the processor and controlled in part by the processor for transporting packages disposed thereon along a path, wherein the package conveyor component includes a first end, a second end, and a buffer portion positioned therebetween, wherein the first end is positioned relative to the outfeed of the object packaging component and the second end is positioned relative to the infeed of the object marking component, wherein the package conveyor component is configured to receive a plurality of packages from the outfeed of the object packaging component at the first end and transport the received plurality of packages through the buffer portion to the infeed of the object marking component at the second end;
 a package adjustment component operatively coupled to the processor and controlled in part by the processor, wherein the package adjustment component is disposed between the first and second ends of the package conveyor component, wherein the package adjustment component is configured to adjust at least one orientation element of at least one package of the plurality of packages disposed on the package conveyor component so that the at least one package assumes a particular orientation with respect to the package conveyor component; and
 an object adjustment component operatively coupled to the processor and controlled in part by the processor, wherein the object adjustment component is disposed between the first and second ends of the package conveyor component, wherein the object adjustment component is configured to adjust at least one orientation element of at least one object contained within at least one package disposed on the package conveyor component so that the at least one object assumes a particular orientation with respect to its associated package;
 wherein the buffer portion is configured to accommodate a plurality of packages received from the outfeed of the object packaging component for a period time before continuing transport to the infeed of the object marking component.

2. The conveyor system of claim 1, wherein the package adjustment component is disposed proximate to the first end of the package conveyor component and the object adjustment component is disposed further along the path of the package conveyor component.

3. The conveyor system of claim 1, wherein the package adjustment component is configured to adjust at least one orientation element of at least one package of the plurality of packages such that the at least one package is substantially perpendicular with respect to the package conveyor component when disposed thereon.

4. The conveyor system of claim 3, wherein the package adjustment component comprises at least one guide rail disposed on opposite sides of the package conveyor component to adjust at least one package of the plurality of packages such that the at least one package is substantially perpendicular with respect to the package conveyor component when disposed thereon and transported to the marking unit.

5. The conveyor system of claim 1, wherein the package adjustment component is configured to adjust at least one orientation element of at least one package of the plurality of packages such that the at least one package is oriented to be at a particular height for transport on the package conveyor component.

6. The conveyor system of claim 5, wherein the package adjustment component comprises at least one guide ramp is configured with respect to the package conveyor component so as to adjust a height of at least one package of the plurality of packages when the at least one package is disposed on the package conveyor component and transported to the object marking component.

7. The conveyor system of claim 1, wherein the object adjustment component is configured to adjust at least one orientation element of at least one object contained within at least one package disposed on the package conveyor component so that the at least one object assumes a particular orientation with respect its associated package for marking thereon by the marking unit.

8. The conveyor system of claim 1, wherein the object adjustment component is configured to adjust at least one orientation element of a plurality of objects contained within at least one package disposed on the package conveyor component so that the plurality of objects in the at least one package assume a consistent, particular orientation therein.

9. The conveyor system of claim 1, wherein the object adjustment component comprises at least one flexible member configured to contact at least one object contained within at least one package to move the at least one object backward and slightly upward to a particular orientation within its associated package.

10. The conveyor system of claim 1, wherein the object adjustment component is configured to adjust at least one orientation element of at least one object contained within at least one package disposed on the package conveyor component while moving along the path of the package conveyor component.

11. The conveyor of system 30, wherein the object adjustment component is configured to move along the path of the package conveyor component at a speed faster than that of the at least one package disposed on and transported by the package conveyor component.

12. The conveyor system of claim 1, further comprising:
at least one sensor component operatively coupled to the processor and controlled in part by the processor, wherein the at least one sensor component is disposed between the first and second ends of the package conveyor component, wherein the at least one sensor is operable to detect operation data associated with at least one operation condition of the conveyor system proximate to the at least one sensor and generate at least one status signal based on at least a portion of the detected operation data;
wherein the processor is operable to generate at least one operation control signal for controlling at least one operation of the conveyor system in response to the at least one status signal.

13. The conveyor of system 32, wherein at least one sensor component is disposed between the package adjustment component and the object adjustment component, wherein the at least one sensor is configured to detect operation data associated with the operation of the package adjustment component and generate at least one status signal based on at least a portion of the detected operation data.

14. The conveyor system of claim 12,
wherein the at least one sensor is operable to detect position status of at least one package disposed on the package conveyor component with respect to the package adjustment component, and generate at least one status signal based on at least a portion of the detected position status; and
wherein the processor is operable to generate at least one operation control signal for controlling at least one operation of the package adjustment component in response to the at least one status signal.

15. The conveyor system of claim 12,
wherein the at least one sensor is configured to detect orientation status of at least one package disposed on the package conveyor component and generate at least one status signal based on at least a portion of the detected orientation status; and
wherein the processor is operable to generate at least one operation control signal for controlling at least one operation of the object adjustment component in response to the at least one status signal.

16. The conveyor system of claim 12,
wherein the processor is further operable to generate a plurality of control signals for controlling at least one operational parameter of at least one associated object packaging component in response to at least one status signal of the conveyor system; and
wherein the processor further comprises an input/output interface operable to transmit a plurality of control signals generated by the processor to the at least one associated object packaging component.

17. The conveyor system of claim 16, wherein the processor is further operable to generate a plurality of control signals for controlling an output of packages by the at least one object packaging component to the first end of the package conveyor component.

18. The conveyor system of claim 1, wherein the buffer portion is of a size and dimension such that packages are received from the outfeed of the object packaging component for a select period of time at a rate that is greater than a rate at which the packages are transported to the infeed of the object marking component.

19. The conveyor system of claim 18, wherein at least one sensor component is disposed proximate to the buffer portion, wherein the at least one sensor is configured to detect operation data associated with the operation of the buffer portion and generate at least one status signal based on at least a portion of the detected buffer operation data.

20. The conveyor system of claim 19,
wherein the processor is further operable to generate a plurality of control signals for controlling at least one operational parameter of at least one associated object packaging component in response at least one status signal associated with the buffer portion; and
wherein the processor further comprises an input/output interface operable to transmit a plurality of control signals generated by the processor to the at least one associated object packaging component.

* * * * *